Figure 1:
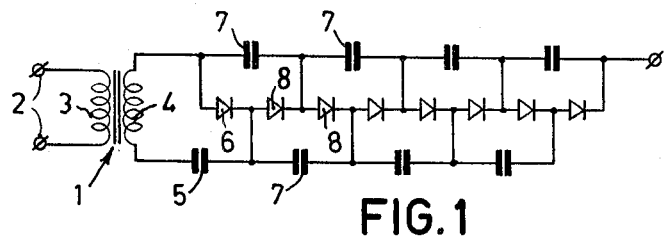

INVENTOR
HENDRIKUS P.J. BREKOO
ADRIANUS VERHOEFF
BY
AGENT

United States Patent Office 3,225,258
Patented Dec. 21, 1965

3,225,258
HIGH TENSION DIRECT CURRENT GENERATOR WITH CIRCUIT ELEMENTS ARRANGED IN CONCENTRIC TUBULAR ARRAY
Hendrikus Petrus Jacobus Brekoo and Adrianus Verhoeff, Emmasingel, Eindhoven, Netherlands, assignors to North American Philips Company, Inc., New York, N.Y., a corporation of Delaware
Filed Dec. 6, 1962, Ser. No. 242,666
Claims priority, application Netherlands, Dec. 8, 1961, 272,363
5 Claims. (Cl. 317—99)

Our invention relates to a generator for direct current at high voltage, for example, 100 kv. And more particularly to such generators for supplying a high voltage direct current to a neutron generator. Since the power output of such a generator is low, i.e., of the order of about 20 watts, the amount of heat developed in the generator is small.

In a conventional high voltage generator of direct current, a number of capacitors are charged through rectifying elements from an A.-C. source, and discharged in series to build up a large D.-C. potential. To reduce the dimensions as much as possible it is known to arrange the elements of the generator in a relatively small space filled with oil, or gas under pressure.

Because the development of heat is small, applicants have found that it is possible to employ a solid insulating material to separate the components and thus, effect a considerable saving in space. As a result, a generator can be built which is extremely compact for use in combination with a neutron generator for exploring oil-bearing layers at great depths beneath the surface of the earth.

Our invention relates, therefore, to a structure for a cascade generator comprising a supply transformer and a circuit constituted by capacitors and rectifiers arranged in three columns within three hollow co-axial cylinders of insulating material. The capacitors are arranged partly in the inner cylinder and partly in the space between the outer cylinder and the central cylinder, and a series-combination of rectifier elements, for example, silicon diodes, which, like the capacitors, is embedded in cast resin, is arranged in the space between the inner cylinder and the central cylinder.

Known high-voltage generators of direct current, employing a cascade arrangement of capacitor, have an irregular field distribution due to a somewhat scattered positioning of their constituent parts, the ratio between the "net" volume and the "gross" volume, which could be referred to as the "space-factor," being unfavorable. By suitable shaping of the structural elements, the advantage of a much more favorable space factor which is already obtained with the arrangement in accordance with the invention may be even greater and the total volume made substantially equal to the volume of all the elements together. This is furthered by winding the series-connected rectifiers helically around the surface of the cylinder and using cylindrically-wound capacitors.

Figure 2:
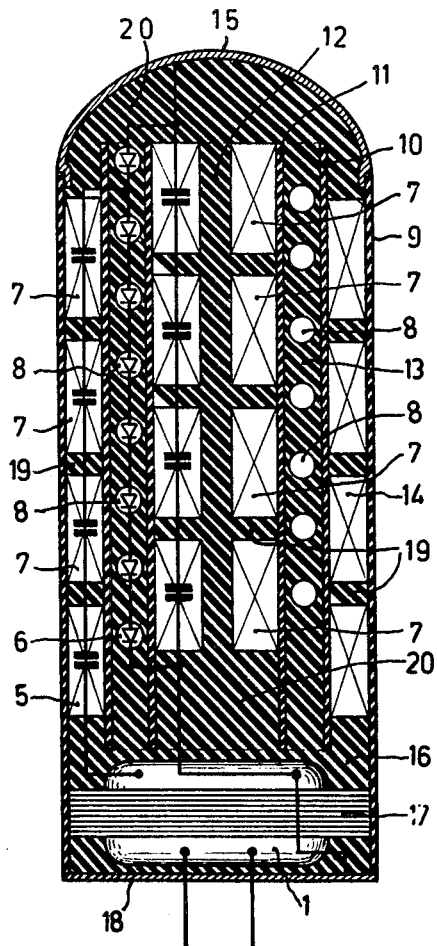

The invention will now be described with reference to the accompany drawing, in which:

FIG. 1 shows the electric circuit diagram; and
FIG. 2 is a sectional view of the generator.

The circuit diagram shows the known circuit arrangement of a generator for a high direct voltage in which a transformer 1 having a primary winding 3 connected to alternating-current terminals 2 has its secondary winding 4 shunted by the series-combination of a capacitor 5 and a rectifier 6. The rectifier 6 is shunted by the series-combination of a capacitor 7 and a rectifier 8 and, subsequently, each rectifier is shunted again by a corresponding series-combination of a capacitor 7 and a rectifier 8 in a manner such that all the rectifiers are connected in series.

This diagram is incorporated in the arrangement of the various component parts and is also shown, for the sake of clarity, in FIG. 2 in which the component parts are otherwise not shown in their actual form.

Three cylinders 9, 10 and 11 of insulating material having different diameters are arranged co-axially, resulting in a cylindrical space 12 and two annular spaces 13 and 14. The outer cylinder 9 constitutes the outer wall of the generator and is closed at one end by a metal protective cap 15 which constitutes the high-tension terminal. At its lower end, the cylinder 9 is longer than the two other cylinders 10 and 11, resulting in a space 16 in which the transformer 1 is accommodated. The base 18 of the cylinder 9 is of metal and may be connected to earth.

The space within the cylinder 9 is divided into three parts 12, 13, 14 by the two other cylinders 10 and 11, the innermost part 12 containing the four capacitors 7 each shunted by two rectifiers 8. The rectifiers are accommodated in the space 13 between the two cylinders 10 and 11. The space 14 between the outer wall 9, and the cylinder 10 is filled with four capacitors 5 and 7, three of which, indicated by 7, are each shunted by two rectifiers and the fourth of which, indicated by 5, is connected in series with the secondary winding 4 of the transformer and a rectifier 6.

It is advantageous to use cylindrically-wound capacitors of a shape which is matched to those of the housing. The rectifier elements are interconnected and are wound helically as a tubing around the inner insulating cylinder.

Interstices 19 between the capacitors, required to avoid short-circuit and electric flash-over, and other inevitable hollow spaces 20 which remain after the component parts have been placed in the cylinders 9, 10, 11, are filled with hardened resin, preferably an ethoxylene resin, commercially known as "Araldite." A transformer core 17 is also matched to the form of the housing.

Such a high-tension generator having a length of 80 cms. and an outer diameter of 7 cms. and which is suitable for connection to a 50 cyles/sec. A.-C. mains can be continuously charged with a current of 200 microamps at a direct voltage of 100 kilovolts.

As a matter of fact, it is also possible to manufacture corresponding generators for a higher frequency of the supply voltage.

Furthermore, the number of capacitors and rectifiers may be greater and hence, the output voltage higher, which results, however, in a decrease of the permissible load current.

While we have described our invention with specific examples and applications thereof, other modifications therein will be apparent to those skilled in the art without departing from its spirit and scope as defined in the appended claims.

What we claim is:
1. A generator of high-voltage direct-current comprising a housing of insulating material defining three co-axial hollow cylinders, a plurality of individual capacitors disposed partly in the innermost cylinder and partly in the space between the outermost cylinder and the central cylinder, and a plurality of rectifying elements disposed in the space between the innermost cylinder and the central cylinder, said capacitors and said rectifiers being embedded in a hardened resin, the rectifiers and capacitors respectively being connected in series arrangement, and the capacitors being connected in parallel with the rectifiers to thereby form a cascaded arrangement in which the capacitors are charged through said rectifiers and discharged in series.

2. A generator as claimed in claim 1 in which the rectifiers are wound helically around the innermost cylinder.

3. A generator as claimed in claim 1 in which the capacitors are cylindrically wound capacitors.

4. A generator as claimed in claim 3 in which the capacitors have a shape conforming to the outermost cylinder.

5. A generator as claimed in claim 1 in which the capacitors and rectifiers are embedded in an ethoxylene resin.

References Cited by the Examiner

UNITED STATES PATENTS

| | | | |
|---|---|---|---|
| 2,971,145 | 2/1961 | Enge | 317—99 X |
| 3,123,760 | 3/1964 | Wouk et al. | 320—1 X |
| 3,128,421 | 4/1964 | Skellet | 320—1 X |

JOHN F. BURNS, *Primary Examiner.*

LARAMIE E. ASKIN, *Examiner.*